United States Patent Office 3,326,805
Patented June 20, 1967

3,326,805
PROCESS FOR PURIFYING POLYETHYLENE AND POLYPROPYLENE
Shigeru Murayama, 1070 Aza Nenoue, Nishi Hongo, Omiya-shi, Saitama Prefecture, Japan
No Drawing. Filed Jan. 29, 1965, Ser. No. 429,111
Claims priority, application Japan, May 7, 1960, 35/23,687
3 Claims. (Cl. 260—93.7)

This application is a continuation-in-part of my copending application Ser. No. 106,496, filed May 1, 1961.

This invention generally relates to resins and is particularly directed to a process for purifying crude polyethylene or polypropylene resins into a pure, powderous product.

The starting product for the inventive process is a gelatinous mass (hereinafter referred to as "solid mass") obtained by dissolving the respective crude resin in a hydrocarbon or chlorinated hydrocarbon solvent and cooling the solution. The process is essentially characterized in that the solid mass thus obtained is emulsified in water in the presence of a non-ionic surface active agent and a neutral detergent. The resin-solvent system in this manner forms a dispersion or suspension in the water-detergent-surface active agent system from which crystalline resin particles gradually precipitate. The precipitating resin particles are of relatively small size and are separated from the liquid phase system, whereafter they are washed with water, squeezed and dried.

The function of the neutral detergent is to protect the fine resin particles from aggregating into larger or coarse particles after the resin particles have precipitated from the emulsion phase.

The amount of water for preparing the emulsion referred to should preferably be substantially equal to the amount of solid resin-solvent system, while the amount of surface active agent and neutral detergent is preferably 2 to 10 weight percent calculated on the total weight of the system.

Prior art processes for purifying polyethylene and polypropylene are dangerous and are carried out under hazardous conditions. The present inventive process is a considerable improvement over the prior art processes as it is carried out safely without danger. Further, the inventive process yields superior products and is more economical than prior art processes. Another advantage of the present procedure as compared to the known processes for preparing polyethylene or polypropylene powder is that the present procedure yields a uniform particle size.

In recent times, the demand for fine powders of polyethylene resin is increasing at a noticeable pace. This is so because such powders are used in large quantities for rust-resisting, corrosion-resistive and insulating films on the surface of metal plates or wires. As is well-known, powders of these resins have been manufactured by subjecting a granular product of polyethylene resin or polypropylene resin as raw material to certain chemical and physical treatments. However, no satisfactory manufacturing method has yet been developed. As to purely physical or mechanical methods for obtaining the powdered products, some of them have already been proposed, but these methods do not produce a powdered product at a yield of above 10% because the frictional heat evolved in the grinding operations which are indispensable in these methods always cause a large portion of the grandular raw material to be plasticized or to dissolve. Furthermore, the powdered product obtained in a mechanical manner is coarse, of 20 to 40 mesh in particle size. These powders, therefore, have a very limited use.

The present invention is particularly an improvement of the process as disclosed in Japanese patent publication Sho 33–9485 claiming the Germany priority of May 24, 1956 and filed by Techinoplast Spindel A.G. of Switzerland. This prior art patent has some serious drawbacks considered from a practical point of view. The present invention, therefore, is basically an improvement of the process as disclosed in said Japanese patent. The drawbacks of the procedure in the Japanese patent referred to can be summarized as follows:

In the working stage, crystalline particles of polyethylene resin, for instance, are precipitated from the resin solution. This prior art process requires the employment of monovalent higher alcohols, polyvalent alcohols, ethylacetate and ethylether either signularly or in a mixture. As is well-known, these substances have a tendency readily to inflame even at a low temperature. Moreover, these substances are expensive and, as large quantities are required, the cost of the process is prohibitive.

As explained above, this known process is also dangerous due to fire hazard.

The present invention overcomes the drawbacks of this prior art process as will be explained by the following example:

EXAMPLE

Preliminary step of the process

A granular product of polyethylene resin which has been prepared under high, moderate and low pressures, respectively, or of polypropylene resin is dissolved in a hydrocarbon or a chlorinated hydrocarbon solvent.

Thus, in the case of high pressure polyethylene resin, 100 kg. of the resin may be admixed with 200 l. of trichloroethylene, while in the case of moderate pressure polyethylene resin or low pressure polyethylene resin or polypropylene resin, 100 kg. of the resin may be admixed with 200 l. of terachloroethylene. The mixing of the resin with the trichloroethylene is carried out by crushing the resin in the liquid medium at room temperature. The mixture thus prepared is placed in an autoclave and homogenized by stirring under a pressure of 2 kg./cm.$^2$. To facilitate the digestion of high pressure polyethylene resin a heating temperature of 65 to 70° C. is applied, while a mixture containing moderate pressure or low pressure polyethylene resin or polypropylene resin is heated to a temperature of 90 to 120° C. The solution thus obtained is then cooled down to room temperature, whereby it solidifies into a gelatinous mass.

The first step of the process

To 100 kg. of the gelatinous mass formed by the solidified solution of resin were added an equal amount of water and a non-ionic surface active agent known in the trade as Noigen (trademark) and a neutral detergent known in the trade as Catiogen (trademark). The commerical product Noigen is polyethyleneglycol nonyl phenol ether while the commercial product Catiogen is alkyl trimethylammonium chloride. The total quantity of surface active agent which thus acts as emulsifier and the detergent, acting as anticoagulant, amounted to 2 to 10 wt. percent. The mixture was then stirred until a white aqueous suspension had been formed. The suspension is partially emulsified by treating it in a homogenizer and is then completely emulsified by means of Micron Mill (trademark). In this manner, resin crystals are separated from the liquid medium which remains as a separate phase in emulsion form.

The second step of the process

The separated crystal particles are precipitated, collectively separated from the emulsion phase and subjected to a treatment sequence consisting of washing with water, dry squeezing and final drying. The separation and collection of the crystal particles is effected by means of a filter press. Due to the presence of the neutral detergent which acts as anticoagulant, aggregation of the particles into larger units is effectively prevented. The crystal particles thus collected are thrown into water in a washing tank and stirred; they float on the surface of the water. The particles are then collected and washed this time with warm water (40 to 50° C.) to remove solvent residues. The particles floating on the surface of the warm water are collected, squeezed dry by means of a centrifugal separator and dried in a low temperature dryer. After passing the dried particles through a fractionating set of sieves, a product of high purity is obtained in a state of fine powder the particles of which are very fine and uniform in size.

The liquor from which the resin particles have been separated is submitted to distillation to recover the solvent and the solvent, in turn, is used again in the first step of the process.

As is evident from the above description, according to the present invention, both chemical and physical treatments are adopted as means for obtaining highly purified resin powder. Whereas the preliminary step of the present process in which polyethylene resin or polypropylene resin is dissolved does not essentially differ from the corresponding step of the aforementioned already patented methods, subsequent steps of the process of the present invention are entirely different.

Thus, according to the present invention, all the substances which are employed for the emulsification and the subsequent precipitation are completely uninflammable and do not endanger safe operation. Moreover, since the necessary amount of the emulsifier is very small as compared with the total weight of the materials concerned, the expense for the emulsifier has little influence on the final moderate price of the product. As a matter of fact, the resin powder prepared by the process of the present invention does not differ in the least from the imported corresponding material in respect to quality, particle size, etc., and nevertheless it is possible to sell the former at far lower prices than the latter. This fact highlights the merits of the process presented by the present invention.

According to the present invention, it is also quite easy to obtain a product of high purity, the powder particles being adjustable in size according to the particular use of the product. The particles have a uniform size in a range as broad as 100 to 400 mesh.

While a specific embodiment of the invention has been shown and described in detail to illustrate the application of the inventive principles, it will be understood that the invention may be embodied otherwise without departing from such principles.

What is claimed is:

1. A process of purifying a granular resin product selected from the group consisting of polyethylene and polypropylene into a powderous resin product of small particle size which comprises dissolving the resin product in a solvent selected from the group consisting of hydrocarbon solvent and chlorinated hydrocarbon solvent, cooling the solution thus obtained until a gelatinous mass has been obtained, dispersing the mass in an equal amount of water, a non-ionic surface active emulsifying agent being polyethylene-glycol nonyl phenol ether and a neutral anticoagulant being alkyl trimethylammonium chloride, the amount of non-ionic surface active emulsifying agent and neutral anticoagulant being about between 2 to 10 weight percent calculated on the total weight, to obtain an emulsion from which solid resin particles precipitate, separating the solid resin particles from the remaining emulsion, washing the solid resin particles free from solvent, and dry squeezing and drying said solid resin particles.

2. A process of preparing a powderous resin product of a resin selected from the group consisting of polyethylene and polypropylene which comprises dissolving the resin in crude granular form in a hydrocarbon solvent at an elevated temperature, cooling the solution to a gelatinous mass, dispersing the mass by agitating it with water, a non-ionic surface active agent being polyethylene glycol nonyl phenol ether, and a neutral anticoagulant being alkyl trimethyl and ammonium chloride into a state of emulsion from which the resin separates in the form of solid particles, removing the solid resin particles from the emulsion, washing the solid resin particles free from solvent and drying the solid resin particles.

3. A process of purifying a granular resin selected from the group consisting of polyethylene and polypropylene into a powderous resin product of small particle size which comprises dissolving the resin product in a solvent selected from the group consisting of hydrocarbon solvent and chlorinated hydrocarbon solvent, adding polyethyleneglycol nonyl phenol ether to the solution, admixing the solution with alkyl trimethylammonium chloride and water to obtain an emulsion from which minute solid resin particles precipitate, separating the solid resin particles from the remaining solution, washing the solid resin particles free from solvent, and drying the particles.

References Cited

UNITED STATES PATENTS

| 2,290,794 | 7/1942 | Alvarado et al. | 260—94.9 |
| 2,870,113 | 1/1959 | Jones | 260—94.9 |

FOREIGN PATENTS

| 515,582 | 12/1939 | Great Britain. |

JOSEPH L. SCHOFER, *Primary Examiner.*

LAWRENCE EDLEMAN, *Assistant Examiner.*